Feb. 21, 1933.   L. H. CHURCH   1,898,617
UNION
Filed Oct. 30, 1930

INVENTOR
LEWIS H. CHURCH
BY ATTORNEY
John M. Montstream

Patented Feb. 21, 1933

1,898,617

UNITED STATES PATENT OFFICE

LEWIS H. CHURCH, OF WESTFIELD, NEW JERSEY, ASSIGNOR TO THE THOMAS & BETTS CO., OF ELIZABETH, NEW JERSEY, A CORPORATION OF NEW JERSEY

UNION

Application filed October 30, 1930. Serial No. 492,202.

This invention relates primarily to couplers or unions whereby the threaded ends of two pipes are joined and the ends of the pipe drawn together to complete a pipe line system. The coupler or union is also suitable for coupling together rods or other members, as desired.

The pipe coupler or union heretofore used to couple the threaded ends of the two pipes together is large in diameter and, consequently, any reduction in the diameter without affecting the efficiency or effectiveness of the coupler in any way has its advantages. By the invention described herein the diameter of one of the bushings making up the coupler is reduced which reduces the size of the entire coupler. The construction by which this result is attained is the subject of the invention.

It is an object of the invention to provide a bushing which is gripped to thread it upon the end of a pipe or other member by interlocking the bushing with the coupling or operating nut so that rotation of the coupling nut will rotate the bushing.

A further object of the invention contemplates a smooth surfaced bushing and an operating nut freely rotatable upon the bushing with interlocking or interengaging means upon these two parts which enable the bushing to be gripped by the operating nut so that the bushing can be threaded upon the threaded end of a pipe or other member.

Another object of the invention is to provide a smooth surfaced bushing having projections which fit into recesses in the operating nut so that the bushing may be turned and threaded upon the end of a pipe or other member by rotation of the operating nut.

Other objects of the invention will be more apparent from the following description taken in connection with the accompanying drawing in which.

The pipe couplers or unions heretofore known consisted of two bushings and an operating nut which bushings were provided with ridges or other corrugations or were hexagonal in form so that they could be gripped by a tool or the fingers of a workman and turned to thread the bushing upon the end of a pipe or other member. These ridges, corrugations or hexagonal form of the bushings necessarily increased the diameter of the bushing and, consequently, increased the diameter of the operating nut and the entire coupler or union as a whole. By removing these ridges or tool gripping means so that the bushing became smooth surfaced upon its exterior, and interengaging means being provided upon the bushing and the nut whereby the bushing may be threaded upon the threaded end of a pipe by rotating the operating nut, the diameter of the coupling as a whole has been materially reduced. It is clear that although the interengaging means is provided upon the operating nut and upon the bushing rotatably carrying the nut primarily to enable a smooth surfaced bushing to be utilized, the construction described herein may also be used whether any tool gripping means are provided on the bushing or not and even though no reduction in the diameter of the coupler or union is contemplated.

Figure 1:
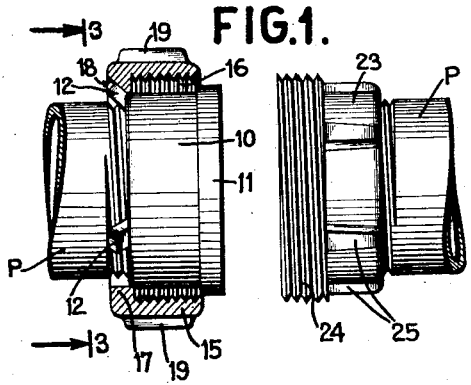
Figure 1 shows a bushing which is screw threaded upon the end of a pipe with the operating nut in position thereupon so that the bushing may be gripped and threaded upon the pipe end by rotating the operating nut with another bushing threaded upon the end of a second pipe end in position to be engaged by the operating nut for coupling the pipe ends together.

The invention as shown in Figure 1 provides a smooth surfaced bushing 10 on which the tool gripping ridges or corrugations are lacking and having an external flange 11 at one end thereof. The smooth surfaced bushing is internally threaded so that it can be threaded directly upon the end of the pipe P. At least one projection 12 is provided at the opposite end of the bushing from the flange 11 which projection is struck or pressed outwardly.

An operating nut 15 is freely rotatable upon the smooth surfaced bushing 10 and carries internal threads 16, the inside diameter of the threads being large enough so that the flange 11 of the smooth surfaced bushing 10 is freely movable longitudinally within the operating nut. The operating nut 15 carries a flange 17 which abuts the flange 11 on the smooth surfaced bushing 10 when the coupler is assembled, as will be hereinafter described. The flange 17 or the end of the nut is provided with recesses 18, one recess being provided for each of the projections 12. The ridges 19 upon the exterior of the operating nut permit the nut to be gripped by a tool and easily rotated thereby, or these ridges provide gripping means for a workman's fingers to assist in assembling the coupler and to couple the ends of pipe together.

A threaded bushing 23 is internally threaded to receive the threaded end of another pipe P which bushing is shown in Figure 1 threaded upon the pipe end. The threaded end of this other pipe and the interior threads upon the threaded bushing are means to secure another member to the threaded bushing. The bushing 23 carries external screw threads 24 for threaded engagement with the internal threads 16 of the operating nut 15 as will be described. The threaded bushing 23 carries upon its exterior surface projections 25 which provide means for aiding in firmly gripping the threaded bushing with a wrench or tool to assist in threading the bushing upon the end of a pipe.

In coupling the ends of two pipes together, the operating nut 15 is slid backward along the flanged or smooth surfaced bushing 10 so that the outwardly extending projections 12 upon the bushing fit into the recesses 18 in the operating nut. It will be seen therefore that the projections 12 and the recesses 18 form interengaging means whereby the flanged or smooth surfaced bushing 10 may be turned for threading it upon the end of a pipe or other member by rotating the operating nut 15. The position of the flanged bushing 10 and the operating nut 15 when the interengaging means are interlocked for rotation is shown in Figure 1 and the bushing has been threaded upon the end of the pipe P by rotating both members while the projections 12 are engaged within the recesses 18 of the operating nut.

When the bushing 10 has been threaded upon the end of the pipe P, the operating nut 15 is pulled forward so that the projections 12 no longer engage within the recesses 18 on the operating nut, in which position the operating nut is freely rotatable upon the smooth surfaced bushing 10. The threaded bushing 23 is then threaded upon the end of another pipe P by using a wrench which grips the projections 25 or if a wrench is not required, the workman is enabled to more firmly grip the bushing by the same ridges 25.

Figure 2:
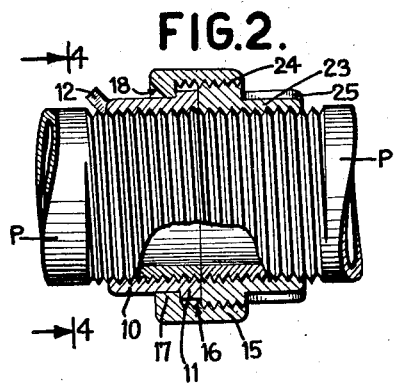
Figure 2 is an assembled view of the union or coupler with the ends of the pipes drawn together.
Figure 3:
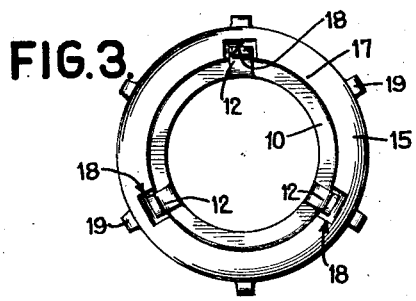
Figure 3 shows the end of the coupler with the projections on the bushing positioned within the recesses on the nut, as viewed from line 3—3 of Figure 1.
Figure 4:
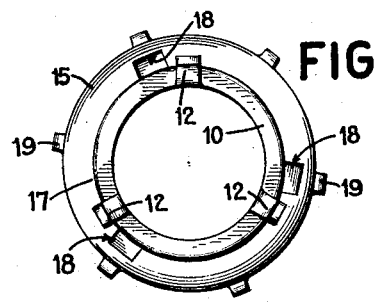
Figure 4 shows the end of the assembled coupler with the projections upon the bushing out of engagement with the recesses on the nut, as viewed from line 4—4 of Figure 2.

With the parts of the coupler substantially in the position shown in Figure 1, the ends of the pipes P are finally coupled together by advancing the operating nut 15 upon the flanged or smooth surfaced bushing 10 so that the shoulders of the flange 11 upon the bushing 10 and of the flange upon the operating nut 15 abut and the internal threads 16 may be engaged by the external threads 24 upon the threaded bushing 23. In this advanced or forward position, the operating nut 15 is freely rotatable upon the bushing 10 without rotating the bushing. The operating nut is then threaded upon the threaded bushing 23 which draws the ends of the pipe and the ends of the smooth surfaced and threaded bushing together so that in completely assembled position the coupler and the pipes are as shown in Figure 2.

Figure 5:
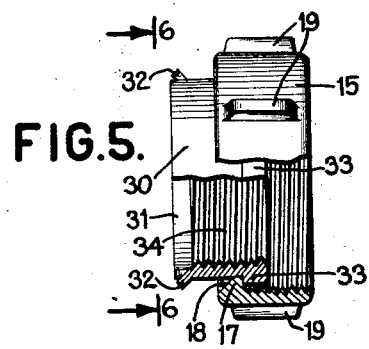
Figure 5 shows a bushing having projections extending outwardly and pressed upwardly from the circular end of the bushing and an operating nut in position upon the bushing.
Figure 6:
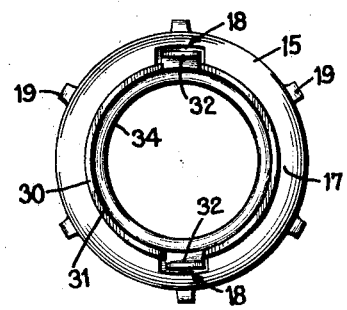
Figure 6 is an end view of the bushing and operating nut with the projections and recesses interlocking, as viewed from line 6—6 of Figure 5.

In Figure 5 the smooth surfaced bushing 30 has a plain end or a rim 31 at its end and at least one projection 32 is sheared and struck up from this rim. The smooth surfaced bushing 30 carries an external flange 33 as in the form shown in Figure 1, and the bushing also carries internal threads 34 to receive the threaded end of a pipe. The operating nut 15 corresponds in every respect with the operating nut of Figure 1 and is provided with the internal flange 17 in the end of which recesses 18 are provided to receive the struck up projections 32. This form of smooth surfaced bushing is very similar to that of Figure 1 and couples together the ends of pipe or other members in the same manner that the coupler of Figure 1 performs this function.

Figure 7:
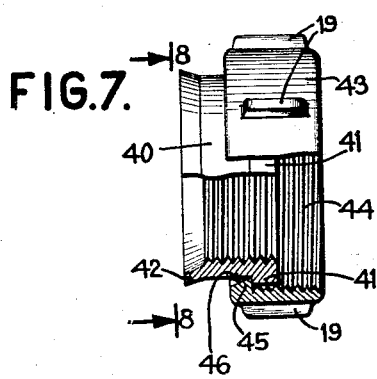
Figure 7 shows a bushing and operating nut in which the end of the bushing is conical and cooperates with a conical surface upon the operating nut which provide frictional or wedging interengaging means for gripping the smooth surface bushing by the operating nut.
Figure 8:
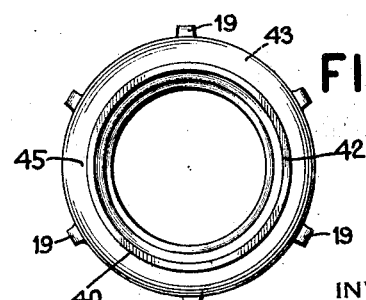
Figure 8 is an end view of the bushing and operating nut taken from line 8—8 of Figure 7.

The flanged or smooth surfaced bushing may be frictionally engaged by the operating nut to rotate and thread the bushing upon the end of the pipe P. A construction of coupler is shown in Figures 7 and 8 in which such frictional engagement is obtained between these two parts of the coupler. The smooth surfaced bushing 40 is internally threaded to receive the threaded end of the pipe and is also provided with an external flange 41 at or adjacent to the end of the bushing, similar to the external flange shown upon the other flanged or smooth surfaced bushings. The other end of the bushing has an edge 42 which has been pressed or forced outwardly thereby forming a conical surface upon this end of the flanged bushing. An operating nut 43 carries internal threads 44 for engagement with the threaded bushing 23 of Figures 1 and 2 and also carries an internal flange 45. The inner surface of the flange 45 is conical to receive the outwardly deflected conical rim or edge 42 so that the flanged or smooth surfaced bushing 40 may be rotated by frictional engagement between the conical surface 46 upon the operating nut and the external conical surface upon the outwardly deflected edge 42 upon the bushing. In this construction of smooth surfaced bushing and operating nut the outwardly deflected edge 42 also retains the nut upon the bushing. The coupler as shown in Figure 7, is assembled in the same manner as the forms heretofore described.

Briefly, the pipe coupler of this invention consists of a flanged or smoth surfaced bushing which is threaded to receive the threaded end of a pipe or other member and an operating nut normally freely rotatable upon the smooth surfaced bushing. Interengaging means are provided upon the bushing and the operating nut so that operating engagement between these two parts is obtained by moving the nut backward upon the bushing and the otherwise smooth surfaced exterior of the flanged bushing may be firmly gripped and rotated for threading the flanged bushing upon the end of a pipe by rotating the operating nut. As previously discussed, the bushing need not have a smooth surfaced exterior in order to utilize the construction described herein. The operating nut may then be moved forwardly of the flanged bushing which disengages the interengaging means and permits the operating nut to rotate freely on the bushing so that it may be threaded upon a threaded bushing to couple the ends of two pipes together.

It is to be noted that the outwardly extending projections 12, 32 and the outwardly extending edge 42 not only provide interengaging means whereby the flanged or smooth surfaced bushing may be rotated by rotating the operating nut, but also provides means for retaining the operating nut upon the flanged bushing so that these two parts may not be separated. It is for this reason that the operating nut should be assembled upon the flanged bushing prior to striking up the projections 12, 32 or the conical edge 42.

What is claimed is:

1. A coupler comprising a threaded bushing having means to receive the end of a member, a flanged bushing having threads to receive the threaded end of a member, an operating nut freely rotatable upon the flanged bushing and having threads to engage the threaded bushing, an internal shoulder on the operating nut to engage the flanged bushing, and interengaging means upon the operating nut and the flanged bushing to rotate the bushing by rotating the operating nut and retaining the operating nut upon the flanged bushing in all positions thereof.

2. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, the operating nut and smooth surfaced bushing forming cooperating members, at least one projection upon one of the cooperating members, and an axial recess for each projection upon the other cooperating member extending partly therethrough in an axial direction and receiving the projection upon backward longitudinal movement of the nut upon the bushing, the projection engaging the internal flange of the nut and being unable to pass through the axial recess thereby retains the nut upon the bushing in all positions.

3. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, at least one projection upon the other end of the smooth surfaced bushing, the projection extending radially outwardly and retaining the nut upon the bushing, and an axial recess for each projection upon the operating nut extending partly through the internal flange on the operating nut and receiving the projection upon backward longitudinal movement of the nut upon the bushing, the projection engaging the internal flange of the nut and being unable to pass through the axial recess thereby retains the nut upon the bushing in all positions.

4. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, at least one projection formed by striking up a portion of the edge of the other end of the bushing, and a recess for each projection extending axially partly through the internal flange upon the operating nut and receiving the projection upon backward longitudinal movement of the nut upon the bushing, the projection engaging the internal flange of the nut and being unable to pass through the axial recess thereby retains the nut upon the bushing in all positions.

5. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, and frictional engaging means upon the operating nut and smooth surfaced bushing engageable upon backward longitudinal movement of the nut upon the bushing to rotate the bushing by rotating the nut.

6. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, and cooperating wedging means upon the operating nut and smooth surfaced bushing, engageable upon backward longitudinal movement of the nut upon the bushing to rotate the bushing by rotating the nut.

7. A coupler comprising a threaded bushing having means to attach the end of a member thereto, a smooth surfaced bushing having threads to attach the threaded end of a second member thereto, an external flange upon one end of the smooth surfaced bushing, an operating nut freely rotatable upon the smooth surfaced bushing and having threads for engagement with the threaded bushing, an internal flange upon the operating nut to engage the external flange upon the smooth surfaced bushing upon forward relative longitudinal movement, an outwardly extending conical rim at the other end of the smooth surfaced bushing, and a conical bore upon the operating nut engageable with the conical rim upon backward longitudinal movement of the nut upon the bushing to rotate the bushing by rotating the nut.

8. A coupler comprising a bushing having external threads and internal threads to attach the threaded end of a member thereto, a smooth surfaced bushing of reduced diameter having internal threads to attach the threaded end of a second member thereto, an external flange upon one end of the smooth surfaced bushing, an operating nut freely rotatable upon the smooth surfaced bushing and having threads for engagement with the external threads on the threaded bushing, an internal flange upon the operating nut to engage the external flange upon the smooth surfaced bushing upon forward relative longitudinal movement, at least one projection upon the end of the flanged bushing opposite from the flange projecting above the smooth surface thereof, and an axial recess having a closed end for each projection upon the end of the operating nut and receiving the projection upon backward longitudinal movement of the nut upon the bushing, the projection engaging the internal flange of the nut and being unable to pass through the axial recess thereby retains the nut upon the bushing in all positions.

In testimony whereof I affix my signature.

LEWIS H. CHURCH.